United States Patent
Novick et al.

(10) Patent No.: US 9,183,268 B2
(45) Date of Patent: Nov. 10, 2015

(54) PARTITION LEVEL BACKUP AND RESTORE OF A MASSIVELY PARALLEL PROCESSING DATABASE

(71) Applicant: Pivotal Software, Inc., Palo Alto, CA (US)

(72) Inventors: Ivan D. Novick, Sunnyvale, CA (US); Abhijit B. Subramanya, San Mateo, CA (US); Swetha Devarayasamudram Nagendran, Sunnyvale, CA (US); Richa Sharma, Sunnyvale, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 154 days.

(21) Appl. No.: 13/861,292

(22) Filed: Apr. 11, 2013

(65) Prior Publication Data

US 2014/0310245 A1    Oct. 16, 2014

(51) Int. Cl.
*G06F 7/00* (2006.01)
*G06F 17/30* (2006.01)

(52) U.S. Cl.
CPC ................................ *G06F 17/30575* (2013.01)

(58) Field of Classification Search
CPC combination set(s) only.
See application file for complete search history.

(56) References Cited

U.S. PATENT DOCUMENTS

| | | | |
|---|---|---|---|
| 6,675,177 B1 | 1/2004 | Webb | |
| 7,831,789 B1 * | 11/2010 | Per et al. | 711/162 |
| 8,392,486 B2 * | 3/2013 | Ing | 708/191 |
| 2005/0262166 A1 | 11/2005 | Rajeev et al. | |
| 2006/0010174 A1 | 1/2006 | Nguyen et al. | |
| 2008/0228783 A1 * | 9/2008 | Moffat | 707/100 |
| 2009/0089313 A1 * | 4/2009 | Cooper et al. | 707/102 |
| 2009/0282203 A1 * | 11/2009 | Haustein et al. | 711/162 |
| 2012/0203742 A1 | 8/2012 | Goodman et al. | |

OTHER PUBLICATIONS

International Search Report and Written Opinion in International Application No. PCT/US2014/033686, dated Aug. 29, 2014, 10 pages.

* cited by examiner

*Primary Examiner* — Apu Mofiz
*Assistant Examiner* — Thu Nga Nguyen
(74) *Attorney, Agent, or Firm* — Fish & Richardson P.C.

(57) ABSTRACT

Techniques to perform an incremental backup of a large-scale distributed database, such as a massively parallel processing (MPP) database, are disclosed. In various embodiments, a set of table partitions each of which satisfies one or more criteria to be included in a current incremental backup is determined at backup time, at least in part by comparing a current table partition meta-information with corresponding meta-information from a prior backup. The table partitions in the set are included in the incremental backup, while other table partitions not in the set are not backed up. In some embodiments, certain tables are designated to be of a type such that existing records are not modified. Tables are partitioned in a manner that isolates changes, e.g., added rows, in a relative few table partitions, leaving others unchanged and therefore able to be omitted from subsequent incremental backups.

20 Claims, 9 Drawing Sheets

PARTITION LEVEL BACKUP AND RESTORE OF A MASSIVELY PARALLEL PROCESSING DATABASE

BACKGROUND OF THE INVENTION

Large-scale distributed data storage systems, such as an EMC Greenplum® massively parallel processing (MPP) database, may store very large volumes of data.

A full database backup takes time and a lot of storage space. In many typical use scenarios, large portions of a database may not change between backups. For example, in an EMC Greenplum® database certain types of table are configured to only have data added to them, such as append-only (AO) tables, to which new rows may be added but the pre-existing rows of which are not modified, or column-oriented (CO) tables, which is an append-only table with column orientation. A column-oriented table stores its content on disk by column rather than by row. In either case if the tables are created as partitions, since the data is only appended to the newest partition the older partitions are never modified and does not have to be backed up.

Performing an incremental backup that includes only data that has changed since the last backup can reduce the time and space required for the backup significantly, but in an MPP or other large-scale distributed database the time and cost associated with determining which data and/or metadata has changed, and which has not, could be very high.

BRIEF DESCRIPTION OF THE DRAWINGS

Various embodiments of the invention are disclosed in the following detailed description and the accompanying drawings.

DETAILED DESCRIPTION

Figure 1:
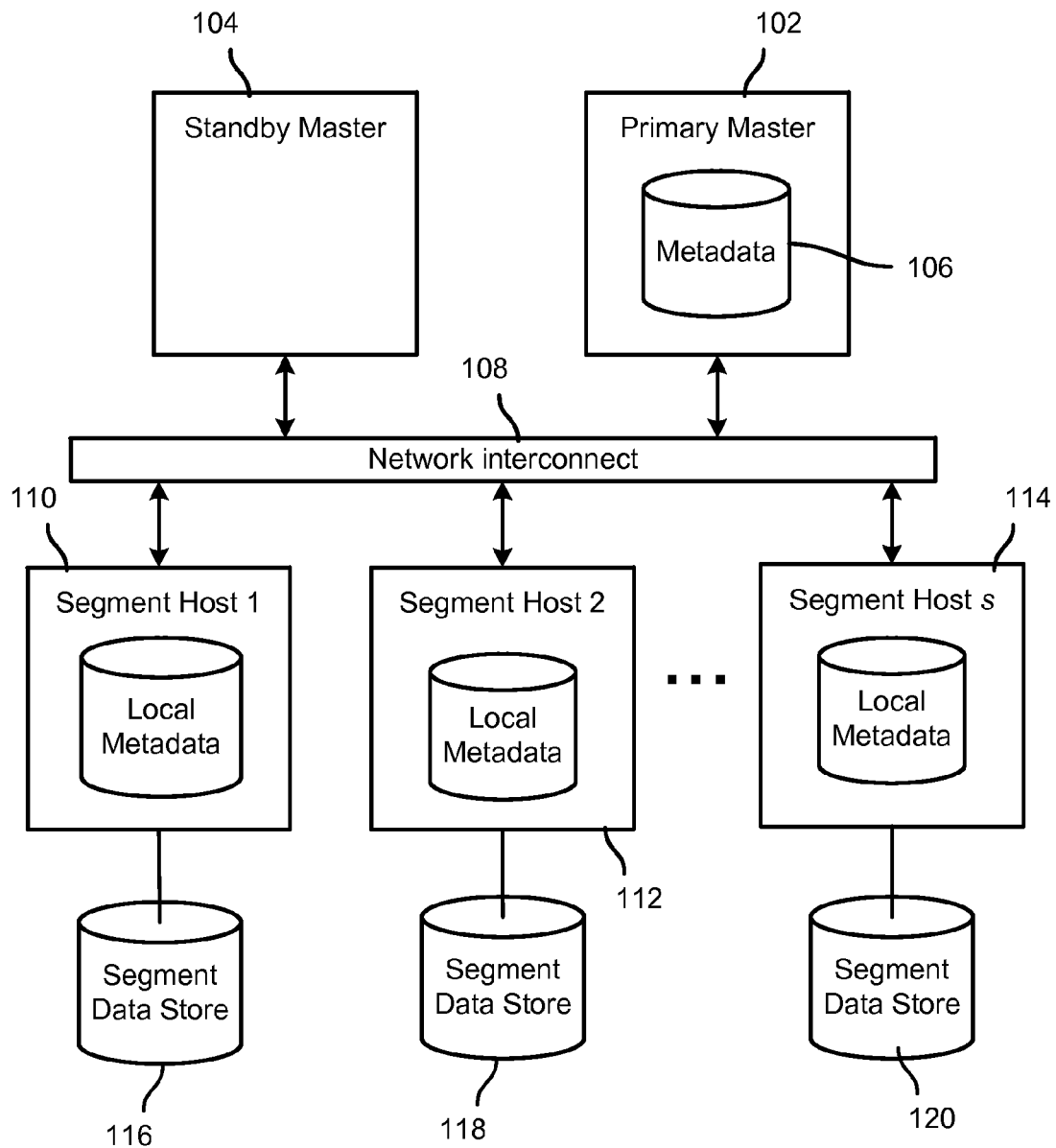
FIG. 1 is a block diagram illustrating an embodiment of a massively parallel processing (MPP) database system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An approach to performing an at least partly incremental backup of a massively parallel processing (MPP) or other large-scale distributed database is disclosed. In various embodiments, at least a subset of tables are partitioned in a manner such that large amounts of data in older partitions that are not modified can be identified and excluded from an incremental backup. In some embodiments, other data tables and/or partitions that may change, such as tables the existing rows of which can be updated, are included in every backup. In some embodiments, database metadata is backed up each time. For append-only or other tables to which data is added over time without modifying previously-stored rows, for example, table state information and/or metadata indicating the latest operations performed on a table and/or partition thereof are used to identify and include in an incremental backup only those tables and/or table partitions that have been changed since the last backup. In some embodiments, to restore data one or more incremental backups and/or associated backup metadata may be used to determine for each table/partition to be restored a corresponding most recent backup from which to restore that table/partition.

FIG. 1 is a block diagram illustrating an embodiment of a massively parallel processing (MPP) database system. Examples of an MPP database system such as the one shown in FIG. 1 include, without limitation, EMC's Greenplum® database. In the example shown in FIG. 1, the MPP database system includes a primary master 102 and a standby master 104. Primary master 102 stores and uses metadata 106 to manage and provide access to data stored in the MPP database. The primary master 102 and standby master 104 are connected via a network interface 108 to a plurality of segment hosts 1 through s, represented in FIG. 1 by segment hosts 110, 112, and 114. In various embodiments, each segment host may host one or more processing segments, each of which uses a corresponding local metadata store to manage a corresponding portion of the data comprising the database. Each segment host stores in a local segment data store, such as segment data stores 116, 118, and 120, data comprising the portion of the database that segment is assigned to manage and store. In some embodiments, the MPP databases employs a "share nothing" approach, in which each segment manages and stores its assigned portion of the database in isolation from each other segment.

In various embodiments, a table can be subdivided into a number of smaller partitions. In some embodiments, all partitioning is horizontal, i.e., each partition will contain complete rows of data. Internally each of these partitions is represented as a child table. The parent table itself will not contain any data. Only the child tables will contain data. In case of tables, which have multiple levels of partitions, only the leaf partitions will contain data. Tables, which are not explicitly partitioned, are considered to be single partitions.

In some embodiments, an administrative user defines tables and designates at least selected tables to be of a type to which new data may be added but once stored existing rows and/or columns of data may not be modified (e.g., append-only tables). In some embodiments, an administrative user may specify one or more parameters to be used to partition a table. For example, in some embodiments where appropriate (e.g., based on the nature of the data) the administrative user may configure one or more tables to be partitioned by date/time, such as by timestamp. An example of a table that it may be advantageous to partition based on date/time is a table provided to store large volumes of data that does not change, such as one configured to store a row of data for each time an action is taken or other event occurs, such as each page view, click through, or other action or event. If such a table were partitioned by date, for example, once a day has ended the data for that day and therefore the data included in that partition would not change, creating a partition that would not need to be included in successive incremental backups, for example.

Figure 2:
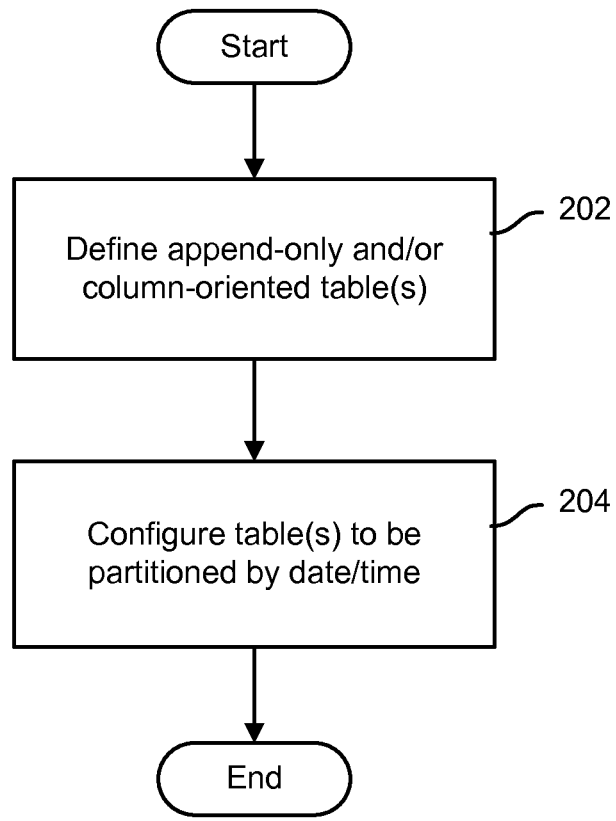
FIG. 2 is a flow chart illustrating an embodiment of a process to define database tables.

FIG. 2 is a flow chart illustrating an embodiment of a process to define database tables. In the example shown, one or more append-only (AO), column-oriented (CO), or other tables the pre-existing rows of which cannot be modified are created (202). The tables are configured to be partitioned based on date/time, for example (204), or based on some other parameter that enables data records that have been added more recently, for example potentially since a last backup, to be isolated from older data that does not change, e.g., a previous day's event log. In various embodiments, column-oriented (CO) tables are append-only tables with column orientation. A column-oriented table stores its content on disk by column rather than by row. In either case (i.e., AO or CO table) if the tables are created as partitions, since the data is only appended to the newest partition and the older partitions are never modified, the older partitions do not have to be backed up during an incremental backup.

Figure 3:
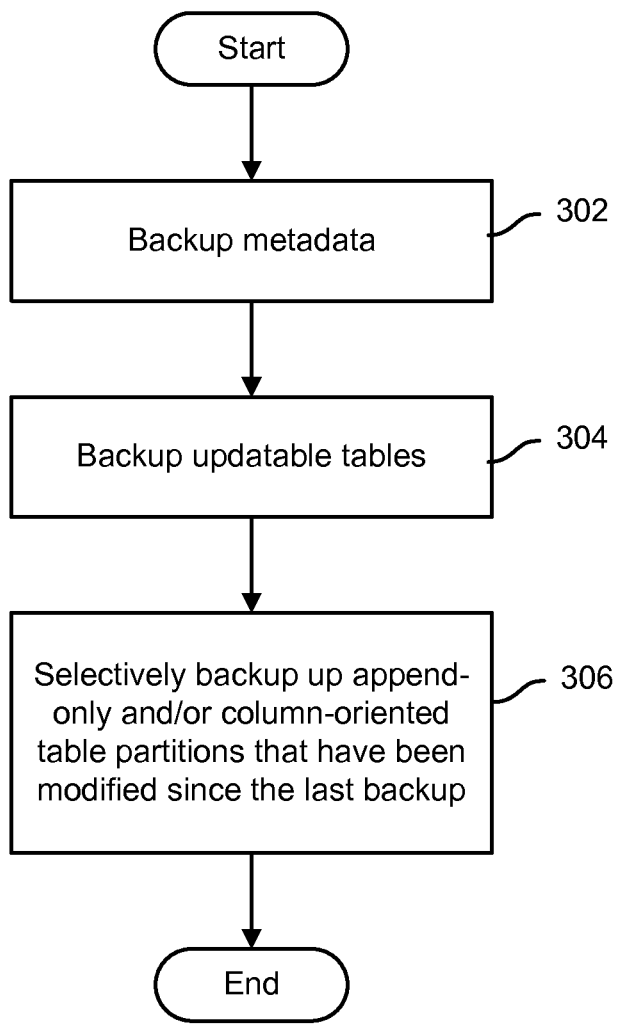
FIG. 3 is a flow chart illustrating an embodiment of a database incremental backup process.

FIG. 3 is a flow chart illustrating an embodiment of a database incremental backup process. In the example shown, to perform an incremental backup the metadata for the entire database (302) and database tables of an updatable type (304) are backed up, as in a full backup. For append-only and/or column-oriented tables, table partitions are backed up selectively to include only those tables (partitions) that have been modified since the last backup (306). For example, date/time based partitions associated with dates/times later than the last backup may be included in the (at least partly) incremental backup, while older partitions that have not changed since the last backup may be omitted.

Figure 4:
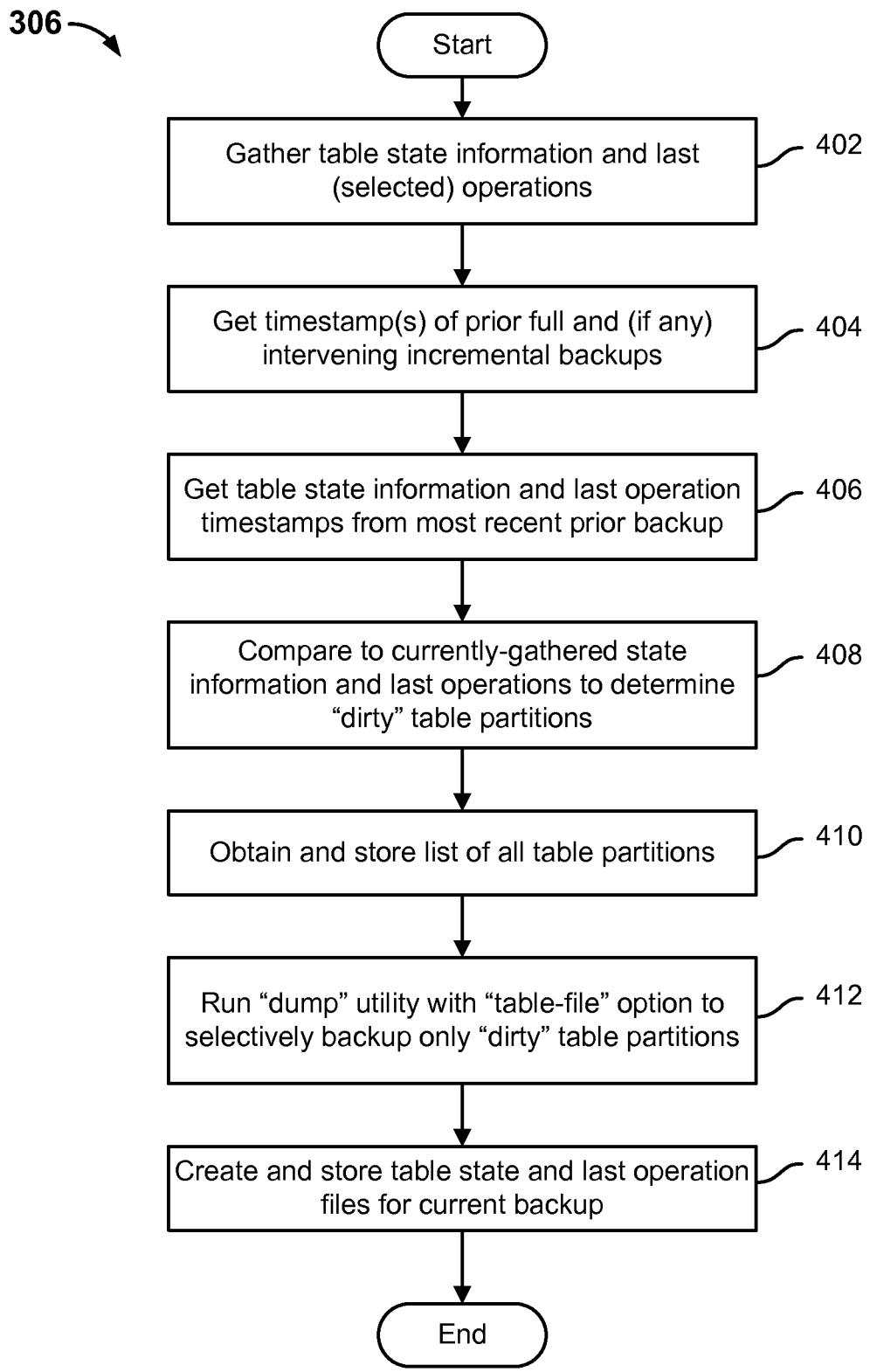
FIG. 4 is a flow chart illustrating an embodiment of a process to selectively back up table partitions that have changed since the last backup.

FIG. 4 is a flow chart illustrating an embodiment of a process to selectively back up table partitions that have changed since the last backup. In some embodiments, step 306 of FIG. 3 includes the process of FIG. 4. In the example shown in FIG. 4, append-only (or other additive) table state information (e.g., number of rows) and metadata indicating the timestamp of the most recent of at least certain selected operations with respect to such tables, e.g., TRUNCATE, ALTER TABLE, and DROP & CREATE table operations, are gathered (402). In various embodiments, timestamps associated with operations that may have resulted in changes to a partition that might not be reflected in other table information, such as the number of rows, are gathered. The respective timestamp of the previous full backup and, if any, any intervening incremental backup(s) is/are obtained (404). In some embodiments, if a valid full backup is not found the incremental backup is aborted and a full backup is performed instead (not shown in FIG. 4). Table state information and last operation timestamp data are retrieved from one or more files comprising and/or otherwise associated with the most recent prior backup (406). The retrieved information is compared to corresponding information gathered for the current incremental backup to generate a list of "dirty" table partitions to be included in the current incremental backup, e.g., because it is determined based on the comparison that the table partition(s) has/have been changed since the last backup (408). A list of all table partitions currently in the database is obtained and stored (410). In some embodiments, the latter list is obtained and stored for use in a future restore operation, if any. A "dump" or other data backup/copy utility is run, with a "table-file" or other option that allows specific tables to be specified, to selectively back up only the table partitions that were identified in step 408 to be "dirty" (412). Table state information and last operation files are created and stored for the current backup (414), e.g., using data gathered in step 402.

Figure 5A:
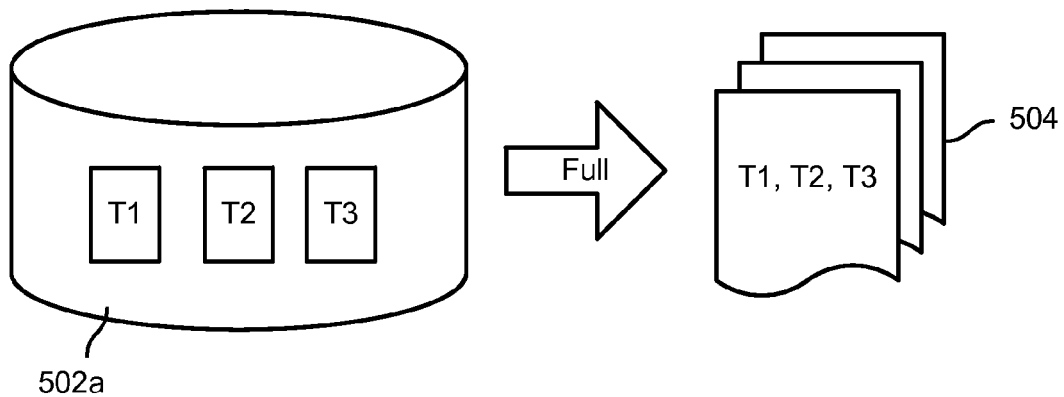
FIGS. 5A-5C are block diagrams illustrating an embodiment of incremental backup in a massively parallel processing (MPP) database system.
Figure 5B:
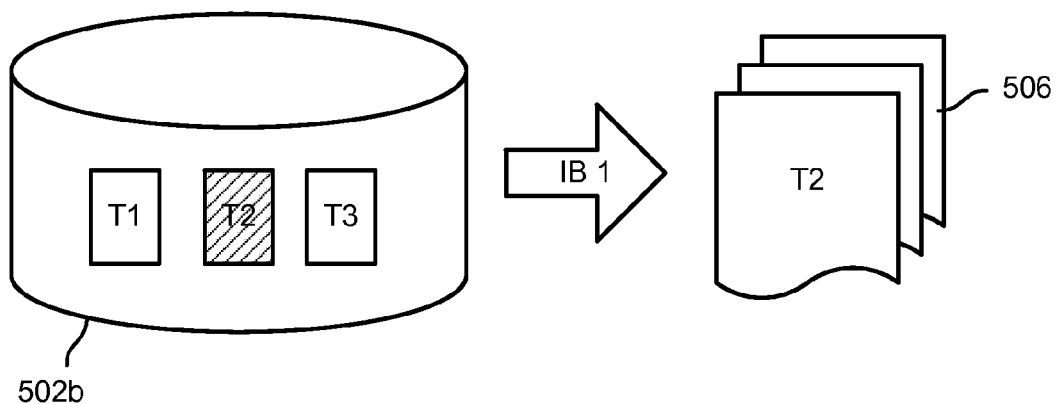
Figure 5C:
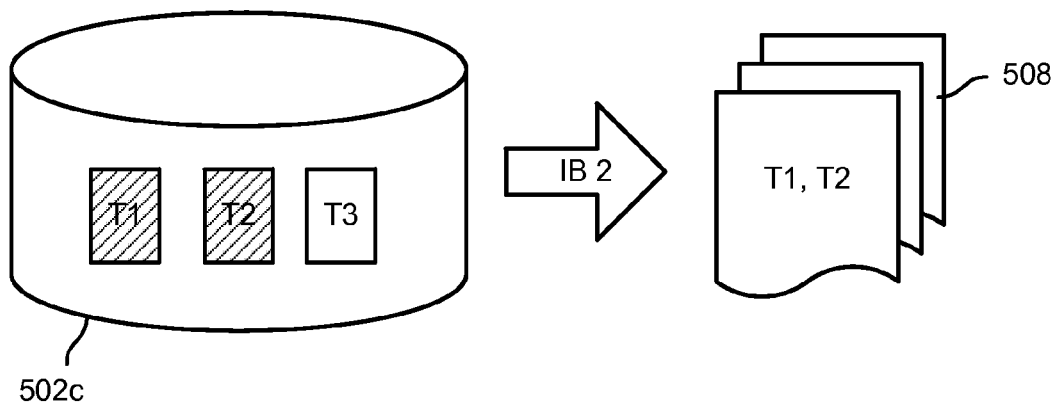

FIGS. 5A-5C are block diagrams illustrating an embodiment of incremental backup in a massively parallel processing (MPP) database system. In the example shown, referring first to FIG. 5A, a database 502a includes three table partitions, T1, T2, and T3. A full backup is performed to generate a set of backup files 504 in which the data comprising partitions T1, T2, and T3 is included. Referring to FIG. 5B, at a time subsequent to the full backup shown in FIG. 5A a first incremental backup "IB 1" is performed. In connection with performing the first incremental backup, as shown in FIG. 5B, partition T2 is identified as having been changed since the full backup shown in FIG. 5A, resulting in partition T2 being marked "dirty", as indicated by the cross-hatching on partition T2 as shown in database 502b of FIG. 5B. For example, a row count or other state information may have been used to determine that rows had been added to partition T2, or last operation information may have indicated a TRUNCATE or other selected operation had been performed since the full backup. As a result, the partition T2 (but not partition T1 or partition T3) is included in the partitions backed up to generate backup files 506 of incremental backup IB 1. Finally, FIG. 5C shows a second incremental backup "IB 2", performed subsequent to the first incremental backup of FIG. 5B. In the second incremental backup shown in FIG. 5C, partitions T1 and T2 are identified as having been changed since the prior incremental backup (IB 1 of FIG. 5B), as shown in the database 502c of FIG. 5C. As a result, partitions T1 and T2 (but not T3) are included in the backup data files 508 generated in connection with the second incremental backup IB 2 of FIG. 5C.

Figure 6:
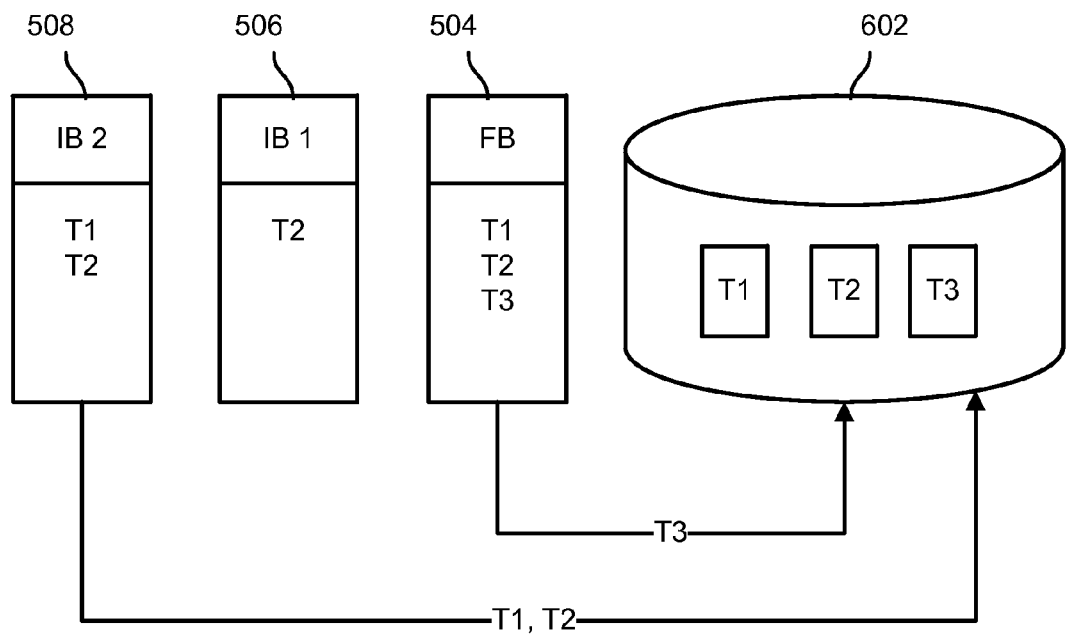
FIG. 6 is a block diagram illustrating an embodiment of data restoration from incremental backup data in a massively parallel processing (MPP) database system.

FIG. 6 is a block diagram illustrating an embodiment of data restoration from incremental backup data in a massively parallel processing (MPP) database system. In the example shown, the partitions stored in connection with the full and incremental backups shown in FIGS. 5A-5C, specifically partitions T1 and T2 as stored in backup data 508 in connection with the second (more recent) incremental backup IB 2, the partition T2 as stored in backup data 506 in connection with the first incremental backup IB 1, and the three partitions T1, T2, and T3 as stored in backup data 504 in connection with the full back "FB" of FIG. 5A, are shown as being used to restore the database to a restored state 602. For example, in some embodiments, an indication may have been received, via an administrative or other user interface for example, to restore the database to a state associated with incremental backup IB 2, selected for example based on a timestamp associated with the incremental backup IB 2. In the example shown in FIG. 6, the backups are processed in reverse time order, starting with the most recent backup associated with the indicated restore time, and continuing until the most recent full backup is reached. In some embodiments, a restore plan is developed by considering the backups in reverse time order. For each backup, the partitions that were included in that backup and which are on the list of partitions required to be restored (because, for example, they existed at the restore time) are added to a list of partitions to be restored using that backup. Any not already included in the plan by the time the full backup is reached are restored using the full backup. In the example shown in FIG. 6, this approach results in the partitions T1 and T2 being restored from the second incremental backup IB 2 (508) and partition T3 being restored from the full backup 504. In this example, the first (earlier) incremental backup IB 1 is not used, because the partition T2 was modified subsequent to the first incremental backup being performed, resulting in a more current set of data for partition T2 being included in the second incremental backup IB 2. In the example shown in FIG. 6, the restored database 602 would at restoration correspond to the state of the database as backed up in the second incremental backup IB 2, i.e., the state shown as 502c of FIG. 5C.

Figure 7:
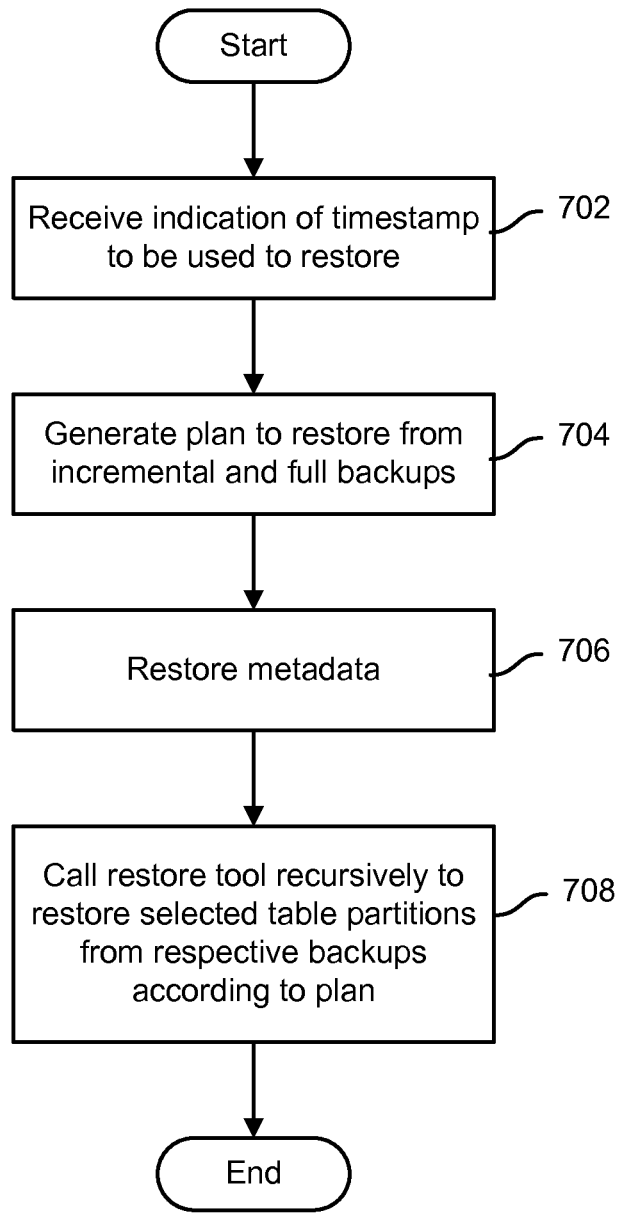
FIG. 7 is a flow chart illustrating an embodiment of a process to restore a database based on backup data that includes one or more incremental backups.

FIG. 7 is a flow chart illustrating an embodiment of a process to restore a database based on backup data that includes one or more incremental backups. In the example shown, an indication of a timestamp to be used to restore the database is received (702). For example, via a user interface an administrative user may have selected a timestamp or other data identifying a backup, such as an incremental backup, based on which the restoration is to be performed, for example to restore the database to a state associated with the selected backup. A plan to restore the database to the indicated state is generated (704). The metadata for the database is restored (706), for example using the metadata as backed up fully in connection with the backup associated with the timestamp indicated for the restore operation (702). A restore tool is called recursively to restore selected table partitions from respective successive backups according to the plan (708).

In some embodiments, data comprising updatable tables are restored from a backup data set associated with the restoration timestamp, since such tables are included and backed up fully in each backup, including incremental backups. Append-only and other additive table partitions are restored from the most recent incremental backup in which each was backed up, or if not included in any incremental backup since the last full backup they are restored from the last full backup.

Figure 8:
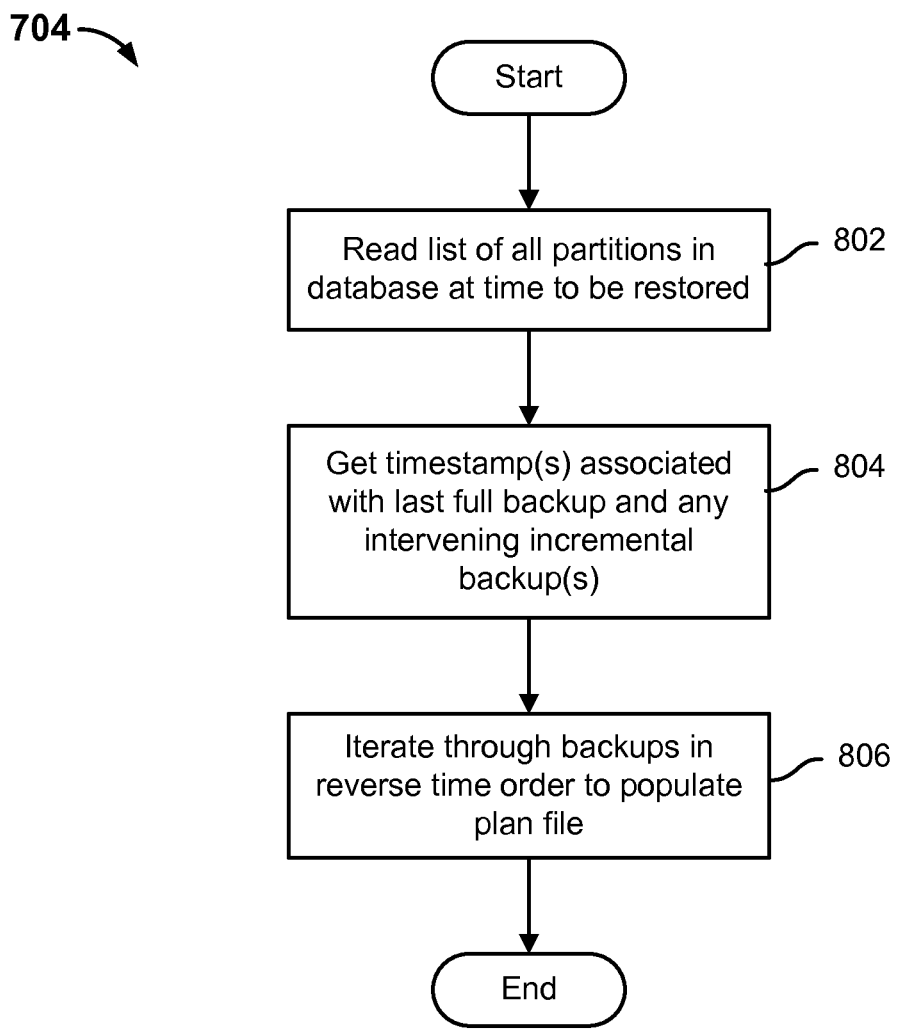
FIG. 8 is a flow chart illustrating an embodiment of a process to generate a plan to restore a database based on backup data that includes one or more incremental backups.

FIG. 8 is a flow chart illustrating an embodiment of a process to generate a plan to restore a database based on backup data that includes one or more incremental backups. In some embodiments, step 704 of FIG. 7 includes the process of FIG. 8. In the example shown, a list of all partitions that were included in the database at a timestamp associated with the restore operation, for example at the time of an associated incremental backup, is read to determine which partitions are to be restored (802). The respective timestamps associated with the most recent full backup and any intervening incremental backups, if any, are determined (804). In some embodiments, the timestamp of the last full backup is determined by searching for a full backup that has a timestamp earlier than a timestamp associated with the restore operation. In some embodiments, the timestamp associated with the last full back is used to locate and read an "increments" or other file that lists incremental backups, for example by timestamp, performed since the last full backup and prior to the timestamp with which the restore operation is associated. The backups (full and any intervening incremental backup) are sorted in reverse time order (most recent to least recent) and are iterated through to populate a restore plan file (806). In some embodiments, the restore plan lists the successive backups from which one or more partitions are to be restored, and for each provides a list of partitions to be restored using that backup. For example, in the example shown in FIGS. 5A-5C and FIG. 6, the plan file in some embodiments would include the following:

IB 2_timestamp: T1, T2
FB_timestamp: T3

Figure 9:
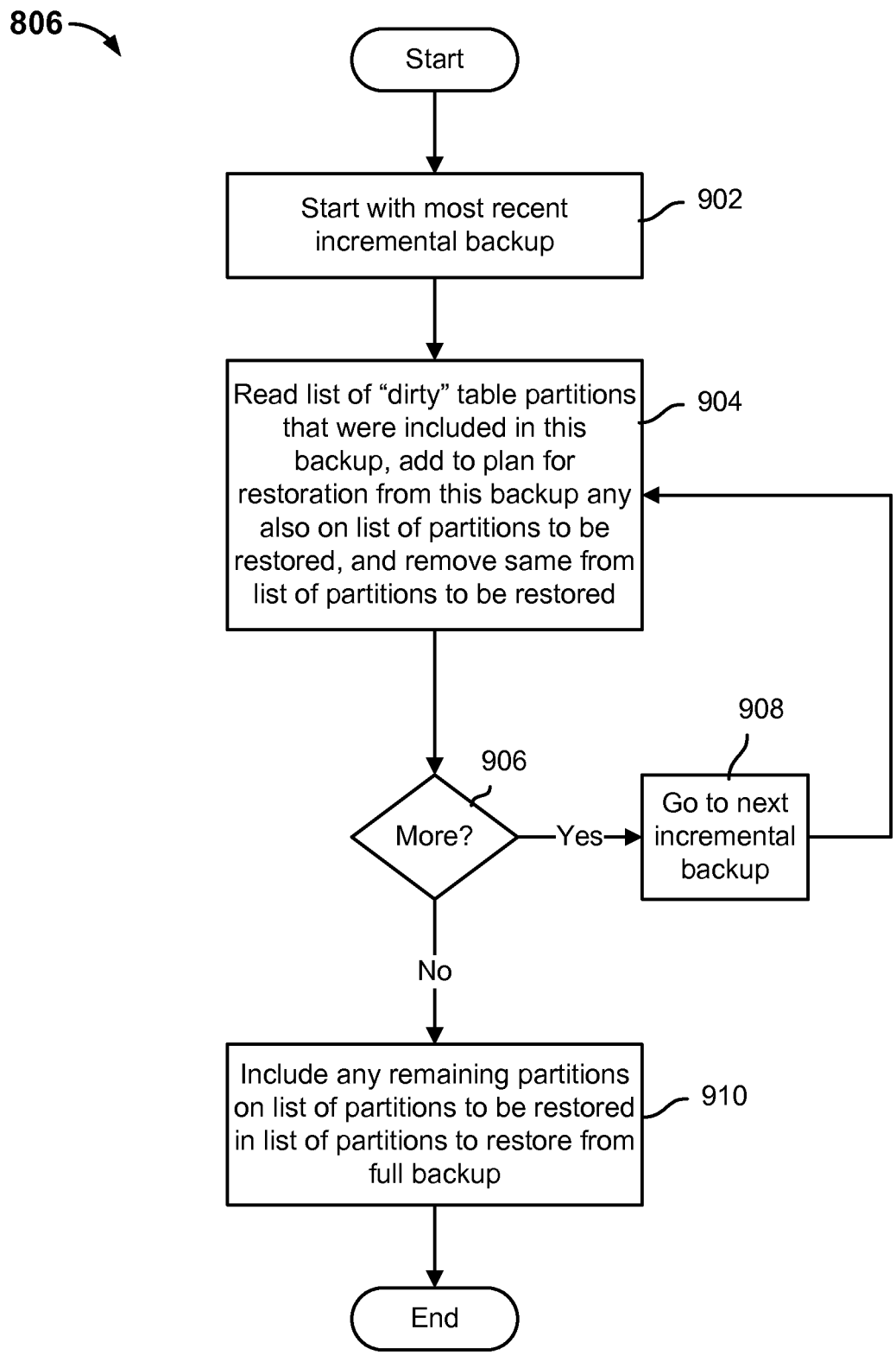
FIG. 9 is a flow chart illustrating an embodiment of a process to populate a plan to restore a database based on backup data that includes one or more incremental backups.

FIG. 9 is a flow chart illustrating an embodiment of a process to populate a plan to restore a database based on backup data that includes one or more incremental backups. In some embodiments, step 806 of FIG. 8 includes the process of FIG. 9. In the example shown, the process starts with the most recent incremental backup (902). The list of "dirty" partitions, i.e., those that were included in that incremental backup, is read, and any table partitions that were included in that backup and which are still on the list of partitions to be restored (starting initially, for example, as the complete list of partitions in the database at the time of the backup associated with the timestamp to which the database is to be restored), i.e., partitions which are to be restored but which have not already been added to the plan to be restored from a previously processed backup, are added to the restore plan to be restored from the backup currently being processed and removed from the list of partitions that need to be restored (904). If more incremental backups remain to be processed, i.e., another one or more were performed subsequent to the incremental backup just processed but prior to the last full backup (906), then the next incremental backup in reverse time order is processed (908). Once the last incremental backup has been processed (906), any remaining partitions are included in the plan as requiring to be restored from the last full backup (910) (e.g., partition T3 in the example shown in FIG. 6), and the process of FIG. 9 ends.

In various embodiments, techniques disclosed herein may be used to increase the speed and efficiency of incremental backups of a large-scale database. A balance is struck between the advantage of backing up only data that has changed since the last backup and the cost of keeping track of which data has changed. The benefits of incremental backup are achieved to a large degree without incurring the high cost of tracking, identifying, and backing up only incremental changes to all data and/or metadata. In various embodiments, tables are partitioned in a manner that tends to isolate data that does not change in older partitions, which are as a result able to be omitted from subsequent incremental backups. Tables in which data may be changed, by contrast, and database metadata, in various embodiments are backed up in every incremental backup without incurring the cost of determining whether and/or precisely which data or metadata has or has not changed. Since full partitions (if "dirty", i.e., determined to have indicia of having been changed since the last backup) are included, if at all, in incremental backups, restore operations may be performed reliably by determining which partitions are to be restored from which incremental (or full)

backup, and iterating through the backups to restore the respective partitions each from the appropriate backup data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing an incremental backup of a database, comprising:
    representing a database table as a plurality of horizontal partitions, the database table including columns and rows of data stored on one or more nodes of a parallel processing database, each horizontal partition comprising one or more complete rows of data and being represented as a child table of the database table, wherein data in the database table is stored in children tables of the database table, and wherein the partitions are based on timestamps;
    determining, at backup time, at least in part by comparing current table partition meta-information with corresponding meta-information from a prior backup, a set of dirty table partitions each of which satisfies one or more criteria to be included in a current incremental backup, wherein the current table partition meta-information comprises timestamps of the most recent of at least certain selected operations on the database table that may alter the database table even when the database table is designated as append-only; and
    selectively backing up the children tables corresponding to the table partitions included in the set, comprising:
        obtaining a list of all partitions of the database table; and
        executing a backup command on the list using an option specifying that only children tables corresponding to the dirty table partitions are selected for backup.

2. The method of claim 1, further comprising omitting from the current incremental backup one or more table partitions that were not determined based on said comparison of meta-information to have satisfied any criteria to be included in the current incremental backup.

3. The method of claim 1, wherein the table partitions included in the set comprise tables of a first type in which at least a portion of the table is not modifiable once written to the database.

4. The method of claim 3, wherein said table of the first type comprising append-only tables.

5. The method of claim 3, further comprising including in the current incremental backup a second set of table partitions of a second type, the table partitions of the second type comprising updatable records, without performing said comparison of meta-information with respect to said table partitions of the second type.

6. The method of claim 1, wherein said meta-information includes table partition state information.

7. The method of claim 6, wherein said table partition state information includes information indicating a number of rows.

8. The method of claim 1, wherein the timestamps include a last timestamp of the one or more selected operations having been performed with respect to a table partition, the last timestamp isolating data records added since a last backup from older data that does not change.

9. The method of claim 8, wherein the one or more selected operations include one or more of the following operations: truncate, alter table, and "drop and create".

10. The method of claim 1, further comprising storing a list of table partitions included in the database at a time associated with the current incremental backup.

11. The method of claim 1, further comprising maintaining a list of incremental backups performed since a last full backup.

12. The method of claim 1, further comprising restoring the database to a state associated with the current incremental backup by iterating through a set of incremental backups since a last full backup, in reverse time order, to determine for each backup a set of table partitions to be restored using that backup.

13. The method of claim 12, further comprising restoring from the last full backup any table partitions not determined to be restored from any incremental backup.

14. A system, comprising:
    a processor configured to:
        representing a database table as a plurality of horizontal partitions, the database table including columns and rows of data stored on one or more nodes of a parallel processing database, each horizontal partition comprising one or more complete rows of data and being represented as a child table of the database table, wherein data in the database table is stored in children tables of the database table, and wherein the partitions are based on timestamps;
        determine at backup time, at least in part by comparing current table partition meta-information with corresponding meta-information from a prior backup, a set of dirty table partitions each of which satisfies one or more criteria to be included in a current incremental backup of a database, wherein the current table partition meta-information comprises timestamps of the most recent of at least certain selected operations on the database table that may alter the database table even when the database table is designated as append-only; and
        selectively back up the children tables corresponding to the table partitions included in the set, comprising:
            obtaining a list of all partitions of the database table; and
            executing a backup command on the list using an option specifying that only children tables corresponding to the dirty table partitions are selected for backup; and
    a memory or other storage device coupled to the processor and configured to store said meta-information.

15. The system of claim 14, wherein the processor is further configured to omit from the current incremental backup one or more table partitions that were not determined based on said comparison of meta-information to have satisfied any criteria to be included in the current incremental backup.

16. The system of claim 14, wherein the table partitions included in the set comprise tables of a first type in which at least a portion of the table is not modifiable once written to the database.

17. The system of claim 14, wherein said meta-information includes table partition state information.

18. The system of claim 14, wherein the timestamps comprise a last timestamp of one or more selected operations having been performed with respect to a table partition, the last timestamp isolating data records added since a last backup from older data that does not change.

19. The system of claim 14, wherein the processor is further configured to restore the database to a state associated with the current incremental backup by iterating through a set of incremental backups since a last full backup, in reverse time order, to determine for each backup a set of table partitions to be restored using that backup.

20. non-transitory, computer readable storage medium storing computer instructions that, when executed by one or more processors, cause the one or more processors to perform operations comprising:

representing a database table as a plurality of horizontal partitions, the database table including columns and rows of data stored on one or more nodes of a parallel processing database, each horizontal partition comprising one or more complete rows of data and being represented as a child table of the database table, wherein data in the database table is stored in children tables of the database table, and wherein the partitions are based on timestamps;

determining at backup time, at least in part by comparing current table partition meta-information with corresponding meta-information from a prior backup, a set of dirty table partitions each of which satisfies one or more criteria to be included in a current incremental backup, wherein the current table partition meta-information comprises timestamps of the most recent of at least certain selected operations on the database table that may alter the database table even when the database table is designated as append-only; and selectively backing up the children tables corresponding to the table partitions included in the set, comprising:
        obtaining a list of all partitions of the database table; and
        executing a backup command on the list using an option specifying that only children tables corresponding to the dirty table partitions are selected for backup.

\* \* \* \* \*

UNITED STATES PATENT AND TRADEMARK OFFICE
CERTIFICATE OF CORRECTION

| | | |
|---|---|---|
| PATENT NO. | : 9,183,268 B2 | Page 1 of 1 |
| APPLICATION NO. | : 13/861292 | |
| DATED | : November 10, 2015 | |
| INVENTOR(S) | : Novick et al. | |

It is certified that error appears in the above-identified patent and that said Letters Patent is hereby corrected as shown below:

In the Claims

Column 9, Line 1: In Claim 20, before "non-transitory" insert -- A --.

Signed and Sealed this
Ninth Day of August, 2016

Michelle K. Lee
*Director of the United States Patent and Trademark Office*